United States Patent
Tose

(10) Patent No.: US 11,470,210 B2
(45) Date of Patent: Oct. 11, 2022

(54) DISPLAY APPARATUS FOR DISPLAYING SHORTCUT MENUS WITH NOTIFICATION INFORMATION OF APPLICATIONS AND NON-TRANSITORY COMPUTER READABLE MEDIUM

(71) Applicant: FUJIFILM Business Innovation Corp., Tokyo (JP)

(72) Inventor: Masahiro Tose, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 247 days.

(21) Appl. No.: 16/505,689

(22) Filed: Jul. 8, 2019

(65) Prior Publication Data

US 2020/0028982 A1  Jan. 23, 2020

(30) Foreign Application Priority Data

Jul. 17, 2018 (JP) .............................. JP2018-134452

(51) Int. Cl.
*H04N 1/00* (2006.01)
*G06F 3/12* (2006.01)

(52) U.S. Cl.
CPC ....... *H04N 1/00424* (2013.01); *G06F 3/1256* (2013.01); *G06F 3/1258* (2013.01); *G06F 3/1259* (2013.01); *H04N 1/00421* (2013.01); *H04N 1/00435* (2013.01); *H04N 1/00472* (2013.01); *H04N 1/00474* (2013.01); *H04N 1/00477* (2013.01); *H04N 1/00482* (2013.01)

(58) Field of Classification Search
None
See application file for complete search history.

(56) References Cited

U.S. PATENT DOCUMENTS

| 10,122,874 | B2 | 11/2018 | Santillan et al. | |
| 10,866,795 | B2* | 12/2020 | Sakai | G06F 9/451 |
| 2006/0212920 | A1 | 9/2006 | Yamaguchi et al. | |
| 2010/0248689 | A1* | 9/2010 | Teng | H04W 12/082 455/411 |
| 2010/0248787 | A1* | 9/2010 | Smuga | H04M 1/724 455/566 |
| 2011/0093816 | A1* | 4/2011 | Chang | G06F 3/0488 715/835 |
| 2012/0102433 | A1* | 4/2012 | Falkenburg | G06F 8/61 715/835 |

(Continued)

FOREIGN PATENT DOCUMENTS

| JP | 2003-101629 | 4/2003 |
| JP | 2014027362 | 2/2014 |

(Continued)

OTHER PUBLICATIONS

"Office Action of Japan Counterpart Application", dated Apr. 19, 2022, with English translation thereof, p. 1-p. 6.

*Primary Examiner* — Henok Shiferaw
(74) *Attorney, Agent, or Firm* — JCIPRNET

(57) ABSTRACT

A display apparatus includes a display section and a display control section. The display control section displays a list of application programs in a shortcut menu in the case where a user performs a specific screen operation on a desired screen displayed on the display section, the application programs having user notification information at the time of the operation.

14 Claims, 10 Drawing Sheets

(56) References Cited

U.S. PATENT DOCUMENTS

| | | | |
|---|---|---|---|
| 2013/0097549 A1* | 4/2013 | Park | G06F 16/14 |
| | | | 715/773 |
| 2013/0246949 A1* | 9/2013 | Kikuchi | G06F 3/0482 |
| | | | 715/765 |
| 2015/0286445 A1* | 10/2015 | Kittaka | H04N 1/00474 |
| | | | 358/1.15 |
| 2015/0363059 A1 | 12/2015 | Tsunoda et al. | |
| 2016/0094735 A1* | 3/2016 | Ogura | H04N 1/00432 |
| | | | 358/1.15 |
| 2016/0360051 A1* | 12/2016 | Santillan | H04N 1/00411 |
| 2018/0013900 A1* | 1/2018 | Hirasawa | H04N 1/00416 |
| 2018/0324567 A1* | 11/2018 | Mao | H04M 1/724 |
| 2020/0019284 A1* | 1/2020 | Horiike | G06F 3/0484 |
| 2020/0064933 A1* | 2/2020 | Zhang | G06F 1/1626 |
| 2020/0304659 A1* | 9/2020 | Hattori | H04N 1/00477 |

FOREIGN PATENT DOCUMENTS

| | | |
|---|---|---|
| JP | 2014165663 | 9/2014 |
| JP | 2015-203969 | 11/2015 |
| JP | 2017004042 | 1/2017 |
| WO | 2005071952 | 8/2005 |

\* cited by examiner

DISPLAY APPARATUS FOR DISPLAYING SHORTCUT MENUS WITH NOTIFICATION INFORMATION OF APPLICATIONS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-134452 filed Jul. 17, 2018.

BACKGROUND

(i) Technical Field

The present disclosure relates to a display apparatus and a non-transitory computer readable medium.

(ii) Related Art

Hitherto, there has been known a technique of replacing a hardware button with a software button from the viewpoint of design improvement, cost reduction, etc. Accordingly, it is necessary to use a software button for various functions that have been achieved by operating a hardware button such as invoking a specific application program, for example.

Japanese Unexamined Patent Application Publication No. 2017-4042 describes a technique of enabling registration and use of a shortcut function while securing the maximum region of a standard menu screen related to image processing in the display region of a touch screen unit. A principal control section causes the touch screen unit to display a shortcut menu screen as superposed on the standard menu screen in the case where a shortcut invoking operation is performed. The principal control section also adds a shortcut icon to the shortcut menu screen, and further causes a storage section to store information on correlation between the added icon and the target standard menu screen. The principal control section causes the touch screen unit to display the corresponding standard menu screen in the case where the shortcut icon is operated.

Japanese Unexamined Patent Application Publication No. 2003-101629 describes a mobile phone that enables a desired application to be started with a simple operation. The mobile phone counts the number of times when application programs are started each time the application programs are started, and registers a predetermined number of application programs in a shortcut region of a memory in the descending order of the number of times of startups. In the case where a software key provided in an operation section is depressed only once, a function fixedly allocated to the software key in accordance with the application program being executed is activated. In the case where the software key is depressed twice, a process to start an application program registered in the shortcut region is performed.

Japanese Unexamined Patent Application Publication No. 2015-203969 describes a device that switches a screen to be displayed on a display provided to an operation panel for a machine tool, the device enabling an operator to immediately move to a desired screen and work with a screen that is easily usable for the operator. The device includes a menu screen on which a plurality of screen invoking icons for invoking a frequently used screen are disposed, and a shortcut screen that is always displayed no matter what screen is being displayed. A menu invoking icon for invoking a menu screen is disposed on the shortcut screen. The screen invoking icons serve as a start button for a program that registers, displays, and deletes such icons as shortcut icons displayed on the shortcut screen, and as a unit that is used to select a screen to be invoked using such icons.

SUMMARY

It is effective to dispose icons for invoking application programs with a large number of times of startups or a high frequency of use on the shortcut screen. On the other hand, some application programs notify the user of a job state, a machine state, etc., and it is necessary to invoke an application program with user notification information irrespective of what display is being displayed.

Aspects of non-limiting embodiments of the present disclosure relate to providing a technique of invoking an application program with user notification information such as a job state or a machine state from a desired screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display apparatus including: a display section; and a display control section that displays a list of application programs in a shortcut menu in a case where a user performs a specific screen operation on a desired screen displayed on the display section, the application programs having user notification information at a time of the operation.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described below with reference to the drawings using an image forming device that includes a display apparatus as an example.

Figure 1:
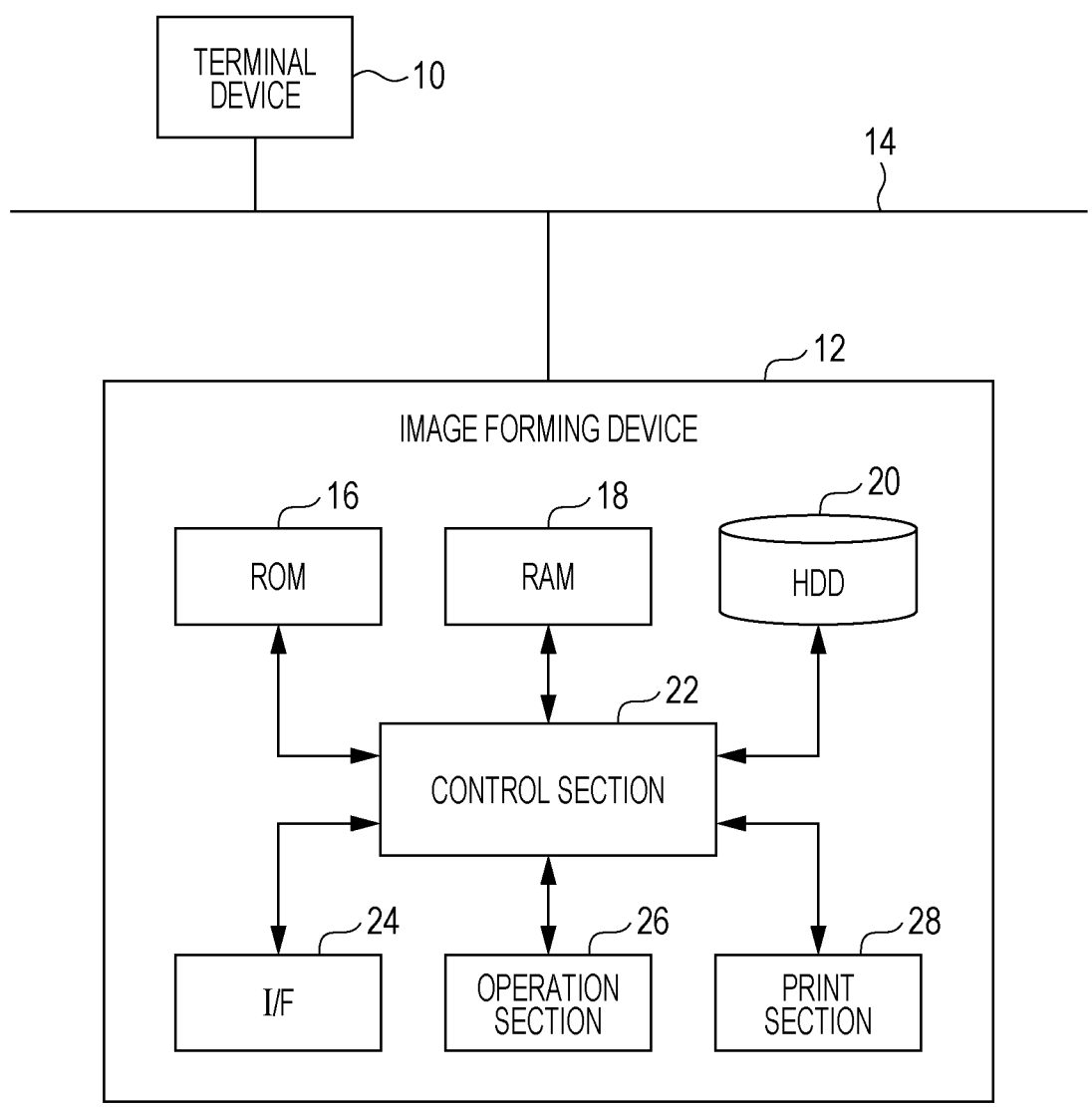
FIG. 1 illustrates the configuration of an image forming device according to an exemplary embodiment.

FIG. 1 illustrates the configuration of a system that includes an image forming device according to the present exemplary embodiment. The system includes a terminal device 10 and an image forming device 12. The terminal device 10 and the image forming device 12 are connected to each other so as to enable data transmission and reception through a communication network 14. The communication network 14 may be, but is not limited to, a data communication network such as a local area network (LAN), for example.

The terminal device 10 is connected to the image forming device 12 via the communication network 14, and transmits a print job that includes a print command to print a document in accordance with an instruction from a user.

The image forming device 12 includes a read only memory (ROM) 16, a random access memory (RAM) 18, a hard disk drive (HDD) 20, a control section 22 composed of one or a plurality of processors, an interface (I/F) 24, an operation section 26 such as a touch screen, and a print section 28. The image forming device 12 may be constituted as a multi-function device that implements a plurality of functions by starting and executing a plurality of application programs (hereinafter referred to simply as "applications") such as copy, facsimile, scan, and print, for example. The image forming device 12 includes a print job receiving module, an interpretation module, and a drawing module as basic functional modules. Such functional modules are implemented by the control section 22, which is composed of one or a plurality of processors, executing a process program stored in the ROM 16.

The print job receiving module receives a print job from the terminal device 10. The print job includes a command to print a document, and data obtained by writing the document to be printed in a page description language (PDL). The PDL is a computer programming language for an information processing device to execute a displaying process, a printing process, etc. The data which are written in the page description language include positional information, format information, and color information on objects such as characters, graphics, and images that constitute the document to be printed. The print job receiving module supplies PDL data included in the received print job to the interpretation module.

The interpretation module interprets the PDL data which are acquired from the print job receiving module, and generates and outputs intermediate data that include a command that represents procedures for generating drawing data in accordance with the interpretation results. The interpretation module generates the intermediate data, and supplies such data to an intermediate data buffer.

The drawing module reads the intermediate data which are stored in the intermediate data buffer, and generates drawing data (raster data) in accordance with the read intermediate data. For example, the drawing module draws an object by calculating a value of each pixel in a range indicated by shape data on the object from color data on the object, and writing the value of the pixel into an address corresponding to the pixel on a page memory. A raster image for one page is formed by drawing all the objects included in the page. The generated drawing data for each page are stored in an output buffer, and sequentially read and supplied to the print section 28. The print section 28 prints the drawing data for each page which are read from the output buffer on a recording medium such as a roll.

The print section 28 includes a known inkjet system, and prints the drawing data on paper. The print section 28 injects liquid or molten solid ink from a nozzle or the like, and records on paper, a film, or the like. The method of injecting ink may be a drop-on-demand system (pressure pulse system) in which ink is injected using an electrostatic attraction force, a thermal inkjet system in which ink is injected using a pressure generated by forming and growing air bubbles using high heat, etc. Ink droplets in various colors are injected by a recording head to an intermediate transfer body to be recorded, and thereafter transferred to paper to be printed. As a matter of course, print may be performed by a xerography system that includes photoconductor charging, light exposure, development, transfer, and fixation processes.

The operation section 26 receives various operations from the user. The operation section 26 includes a touch screen. Software buttons that are used by the user to operate the image forming device 12 are displayed on the touch screen. The control section 22 displays the software buttons on the touch screen by executing a process program stored in the ROM 16 or the HDD 20.

Figure 2:
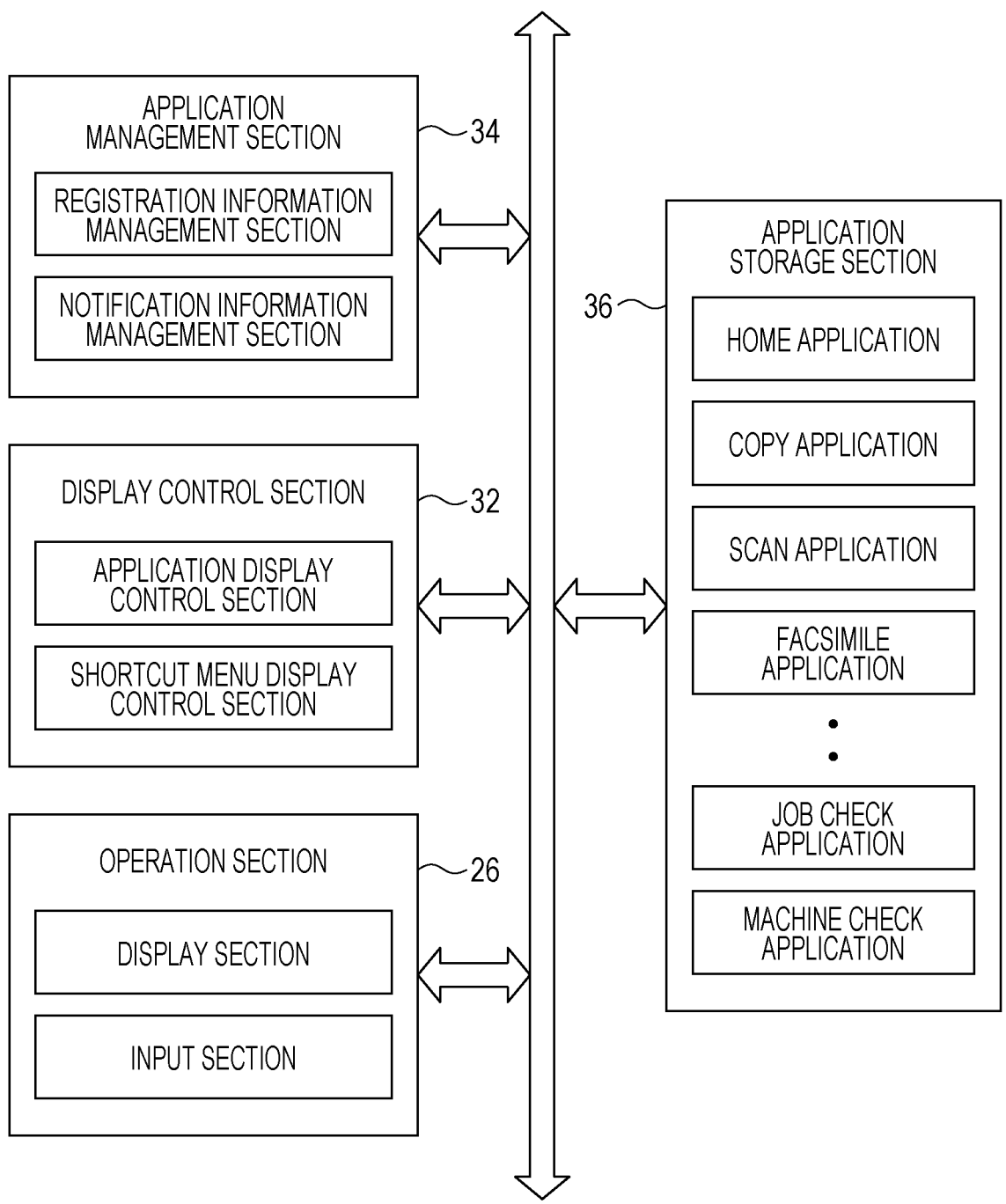
FIG. 2 is a functional block diagram of the image forming device according to the exemplary embodiment.

FIG. 2 is a block diagram of a display function of the control section 22 to display an application screen and various software buttons in accordance with an operation by the user on the operation section 26. The operation section 26 includes a display section such as a touch screen and an input section. The input section includes hardware buttons and software buttons displayed on the touch screen. The display section 22 includes a display control section 32, an application management section 34, and an application storage section 36 as functional blocks for the display function.

The display control section 32 displays the application screen and the software buttons on the touch screen of the operation section 26. The display control section 32 includes an application display control section and a shortcut menu display control section as functional modules. The application display control section is a module that executes display control such as switching between applications, and starts and displays a corresponding application on the touch screen upon receiving a notification of an operation on the touch screen of the operation section 26.

The shortcut menu display control section is a module that executes display control for a shortcut menu, and has a function to invoke the shortcut menu, a function to display the shortcut menu, and a function to execute the shortcut menu. The "shortcut menu" is a menu that pops up by clicking an item in a graphical user interface (GUI), and that provides a list of options that are varied in accordance with a context such as the operation, the application being executed, and the selected item.

The function to invoke the shortcut menu is implemented by incorporating a component (software button) for invoking the shortcut menu as a part of the application.

The function to display the shortcut menu is implemented by displaying the shortcut menu when a component (software button) for invoking the shortcut menu is operated. The shortcut menu pops up on the application screen being displayed.

The function to execute the shortcut menu is implemented by executing a process that matches a selected item when the user performs an operation to select an item in the shortcut menu being displayed.

The application management section 34 includes a registration information management section and a notification information management section as functional modules. The registration information management section manages registration information on an application. The registration information includes information on the representational figure (icon), the label, and the name of each application displayed on a home screen. The notification information management section manages information on user notification from an application. The application registers information that the user should be notified of in the notification information management section in the case where such information is generated. When an inquiry is received from the application, the notification information management section responds with the presence or absence of any user notification information and the content of such information for each application.

The application storage section 36 stores each application installed in the image forming device 12. The application may be of any type. Examples of the application include a copy application, a scan application, a facsimile application, a job check application, and a machine check application, and also include a home application that generates and displays a home screen that displays the icon and the label of each application.

The operation section 26 is provided with a home button as a hardware button. When the user performs an operation to depress the home button, the application display control section of the display control section 32 executes a process to start the home application in response to the operation. That is, the display control section 32 acquires a list of applications from the registration information management section of the application management section 34, and displays the icon and the label of each application. In addition, the display control section 32 makes an inquiry of the notification information management section about the presence or absence of any user notification information for each application, and in the case where any user notification information is present, displays a user notification for each application on the basis of such user notification information. When the user performs an operation to select the icon of an application, further, the display control section 32 executes a process to start the corresponding application in response to the operation.

The user notification information notifies the user of an event, an abnormality, etc. caused when executing an application, and is determined for each application. Examples of the user notification information include the following.

(1) For the job check application for checking the status of execution of a job:
the number of jobs being executed and the content of the jobs are displayed as the user notification information in the case where there is any job being executed.

(2) For the machine check application for checking the status of a machine:
the number of abnormalities and warnings and the content of the abnormalities and the warnings are displayed as the user notification information in the case where there is any abnormality or warning with the system or consumables.

(3) For a facsimile reception box application for viewing a confidential box that stores received facsimile documents:
the number of received facsimile documents is displayed as the user notification information.

(4) For a private print application for temporarily accumulating documents to be printed in the image forming device and allowing a print document to be selected and printed using the touch screen:
the number of accumulated documents is displayed as the user notification information.

The display control section 32 makes an inquiry of the notification information management section about the presence or absence of any user notification information, and in the case where any user notification information is present, displays a user notification for each application. For example, the display control section 32 displays the user notification information as superimposed on the icon of each application displayed on the home screen.

It should be noted, however, that only displaying the user notification information as superimposed on the icon of each application displayed on the home screen in a state in which the user starts a certain application by performing an operation to select the application and a screen for the application is displayed, user notification information for other applications that are not started may not be grasped. Thus, the user returns to the home screen to check the presence or absence of any user notification information on a case-by-case basis, which complicates the operation. In the case where a large number of application icons are displayed on the home screen, in addition, it is troublesome to find an application with user notification information from among the large number of icons.

Thus, the display control section 32 makes an inquiry of the notification information management section of the application management section 34 to prepare a list of applications with user notification information, and then displays the list of applications on a desired screen as incorporated in the shortcut menu.

As discussed already, the shortcut menu display control section has the function to invoke the shortcut menu, the function to display the shortcut menu, and the function to execute the shortcut menu, incorporates a component (software button) for invoking the shortcut menu as a part of the application, and pops up the shortcut menu on the application screen being displayed when the software button is operated by the user. At this time, a list of applications with user notification information is displayed as an item in the shortcut menu.

The display control section 32 and the application management section 34 are implemented by the control section 22 using the RAM 18 as a working memory and executing a process program stored in the ROM 16 or the HDD 20. The application storage section 36 is implemented by the HDD 20. Some of the functions may be implemented by hardware processing, rather than software processing performed by executing a program. The hardware processing may be performed using a circuit such as an application specific integrated circuit (ASIC) or a field programmable gate array (FPGA), for example.

The process according to the present exemplary embodiment will be described more specifically below.

Figure 3:
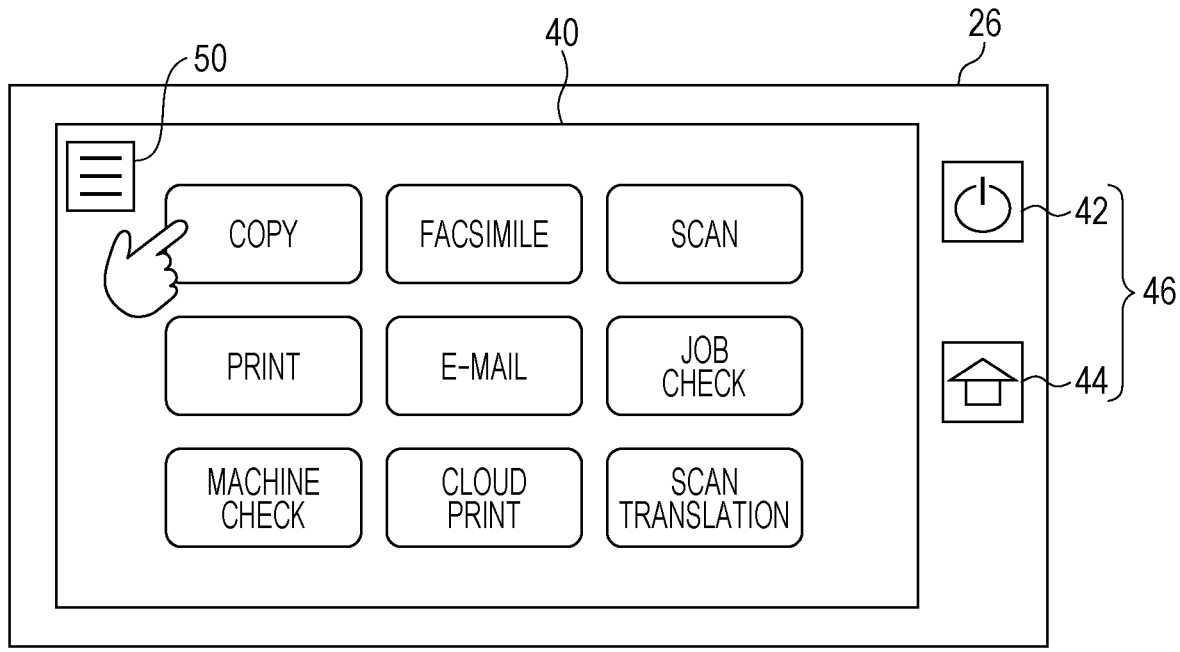
FIG. 3 illustrates a screen (first screen) according to the exemplary embodiment.

FIG. 3 illustrates the operation section 26 of the image forming device 12. The operation section 26 includes a touch screen 40 and hardware buttons 46.

A home application screen (home screen) is displayed on the touch screen 40 by the display control section 32. The icons and the labels of various applications are displayed on the home screen. In the drawing, the home screen displays the icons of copy, facsimile, scan, print, E-mail, job check, machine check, cloud print, and scan translation applications. The user provides the image forming device 12 with an instruction for a process to start a desired application by performing an operation to select the icon of the application.

In addition, a shortcut menu button 50 is displayed at a preset position, e.g. the upper left portion, of the home screen. The shortcut menu display control section of the display control section 32 displays the shortcut menu button 50, which is a component for invoking the shortcut menu, at the upper left of the screen as incorporated in a part of the home application when starting the home application. The home application may incorporate the shortcut menu in a part thereof, rather than the display control section 32 incorporating the shortcut menu button 50 in a part of the home application. The shortcut menu button 50 is displayed as incorporated in all the screens including the home screen.

The hardware buttons 46 include a sub power button 42 and a home button 44, for example. The sub power button 42 is a button that is used to transition to a screen that displays "shut down", "restart", and "power-saving mode" buttons. Meanwhile, the home button 44 is a button that is used to return to the home screen.

When the user performs an operation to select the "copy" icon, for example, in FIG. 3, the display control section 32 detects the operation, performs a process to start the copy application, and displays a copy application screen on the touch screen 40. In the case where the application is a web application, for example, the display control section 32 displays a screen using a rendering engine of a web browser or the like.

Figure 4:
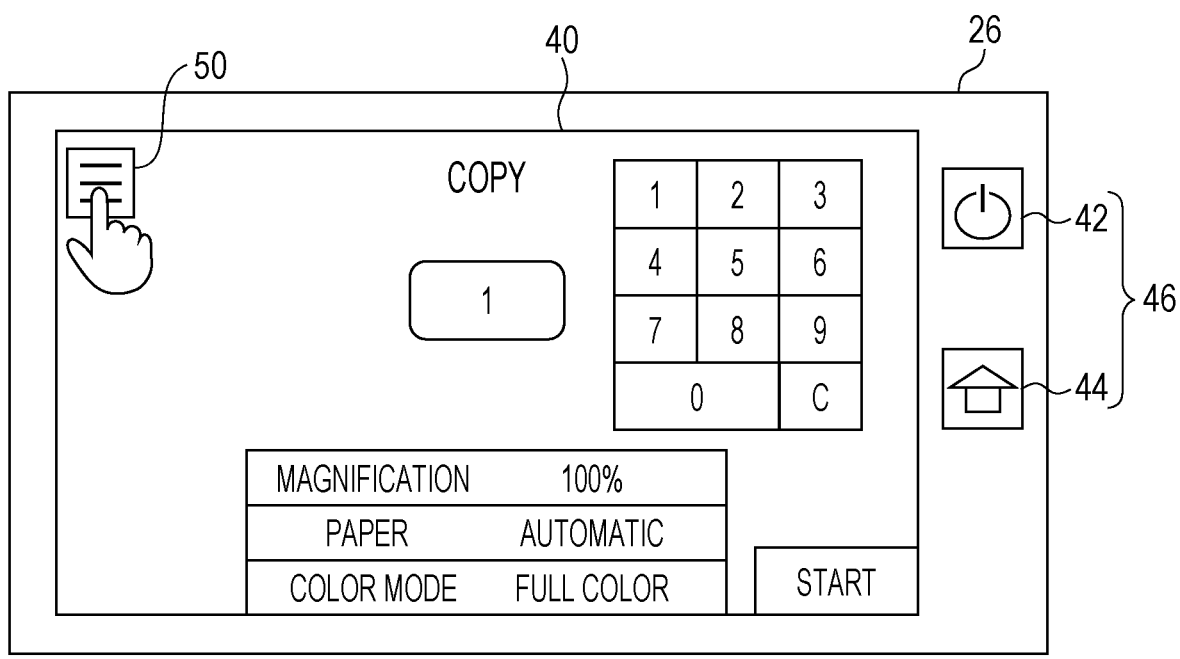
FIG. 4 illustrates a Screen (second screen) according to the exemplary embodiment.

FIG. 4 illustrates an example of the copy application screen which is displayed in the case where the user performs an operation to select the "copy" icon. The screen displays an input field for input of the number of copies and a software numeric keypad. The screen also displays copy menu items for setting the attribute of copying, i.e. magnification, paper, color mode, etc.

The shortcut menu button 50 is also displayed at the upper left portion of the copy application screen, as with the home screen. The shortcut menu display control section of the display control section 32 displays the shortcut menu button 50 at the upper left of the screen as incorporated in a part of the copy application when starting the copy application.

When the user performs an operation to select the shortcut menu button 50 in FIG. 4, the shortcut menu display control section of the display control section 32 detects this operation, and pops up the shortcut menu on the copy application screen. For the shortcut menu, a default menu may be registered, or the user may register an application or action to be executed in association with a specific item, in the application management section 34.

Figure 5:
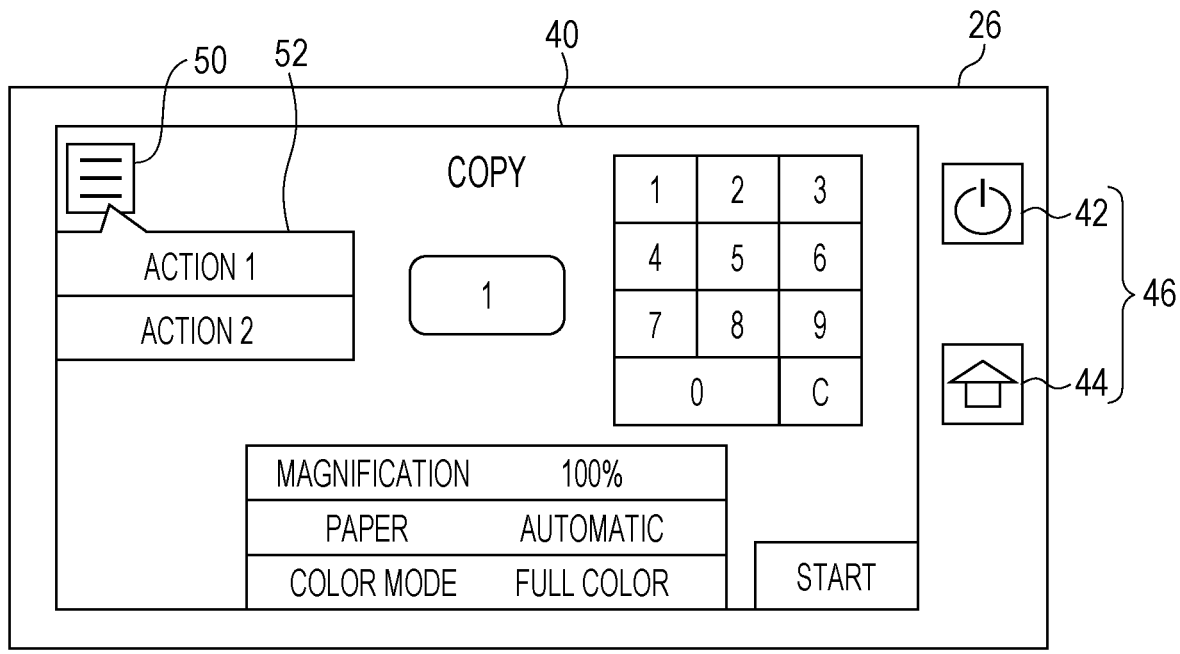
FIG. 5 illustrates a screen (third screen) according to the exemplary embodiment.

FIG. 5 illustrates an example of a basic screen for a case where the user performs an operation to select the shortcut menu button 50. If an "action 1" and an "action 2" are registered in advance in the shortcut menu, the "action 1" and the "action 2" may be registered by default, or may be additionally registered by the user. The shortcut menu display control section acquires a registered shortcut menu 52 (which is composed of the "action 1" and the "action 2") from the application management section 34, and pops up the shortcut menu 52. The user is able to give an instruction to execute a desired action by performing an operation to select a desired menu from the shortcut menu 52 which has popped up.

On the copy application screen illustrated in FIGS. 4 and 5, on the other hand, the user may not be able to visually recognize user notification information, even if there is any, for a different application, e.g. the machine check application, setting aside a case where user notification information is present for the copy application. In such a case, the user may check the presence or absence of any user notification information by transitioning to the home screen by operating the home button 44.

Figure 6:
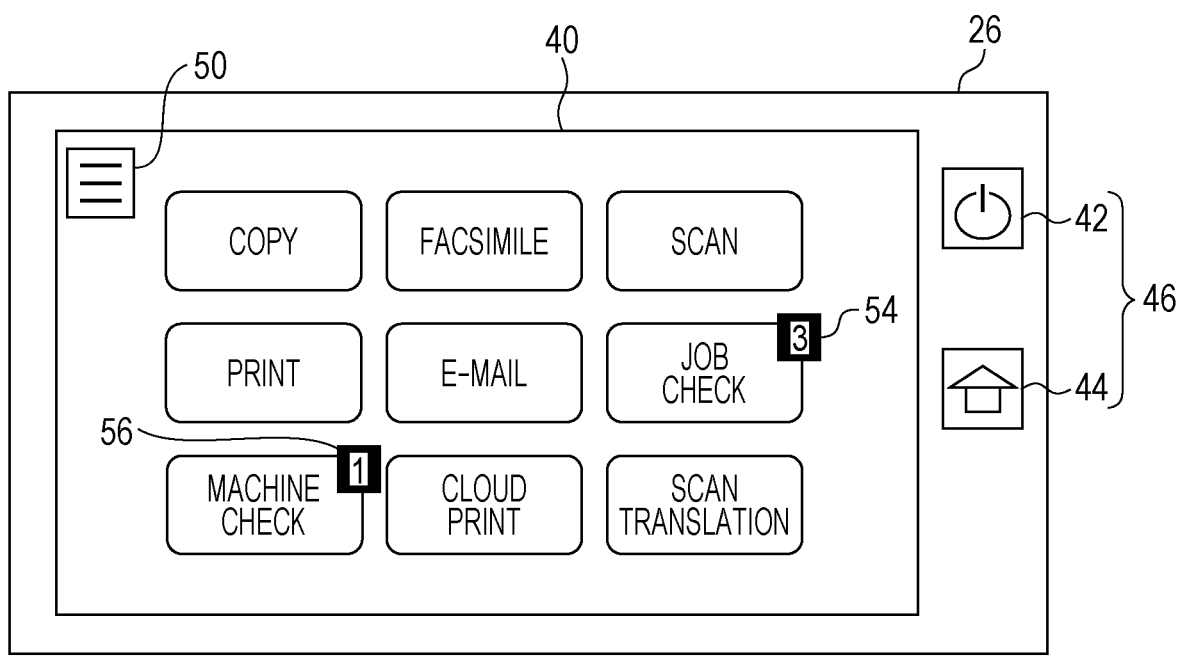
FIG. 6 illustrates a screen (fourth screen) according to the exemplary embodiment.

FIG. 6 illustrates an example of the home screen for a case where user notification information is present. In the screen example, user notification information is present for the job check application and the machine check application. The application display control section of the display control section 32 makes an inquiry of the notification information management section of the application management section 34 about the presence or absence of any user notification information for each application, and if there is any user notification information for the job check, application and the machine check application, displays an icon that indicates the presence of the user notification information and the number of notifications. For example, as illustrated in FIG. 6, a black square icon 54 is displayed as superimposed on the icon of the job check application if three pieces of user notification information are present for the job check application, and a black square icon 56 is displayed as superimposed on the icon of the machine check application if one piece of user notification information is present for the machine check application. This screen allows the user to grasp the presence of user notification information for the job check application and the machine check application.

It should be noted, however, that the content of the user notification information may not be checked unless a transition is temporarily made from the copy application screen to the home screen and thereafter to each application screen.

Thus, the display control section 32 additionally displays a list of user notification information that is present at the time as a menu item in the shortcut menu with focus placed on the fact that the shortcut menu button 50 is always displayed at a predetermined position (the upper left portion of the screen) on all the screens, that is, not only the home screen but also other application screens, and that a desired process may be executed immediately from the screen using the shortcut menu. The shortcut menu display control section of the display control section 32 checks the presence of any user notification information by making an inquiry of the notification information management section of the application management section 34 in constant control cycles, and if any user notification information is present, prepares a list of the user notification information and adds the list as a menu item in the shortcut menu.

For example, if three pieces of user notification information are present for the job check application and one piece of user notification information is present for the machine check application, an item indicating that three pieces of user notification information are present for the job check application and an item indicating that one piece of user notification information is present for the machine check application are further added, in addition to the "action 1" and the "action 2", as menu items in the shortcut menu. In the case where the user performs an operation to select such a menu item additionally displayed, the display control section 32 performs a process to start an application so as to transition to an application screen with user notification information.

Figure 7A:
FIGS. 7A and 7B illustrate a process according to the exemplary embodiment.
Figure 7B:
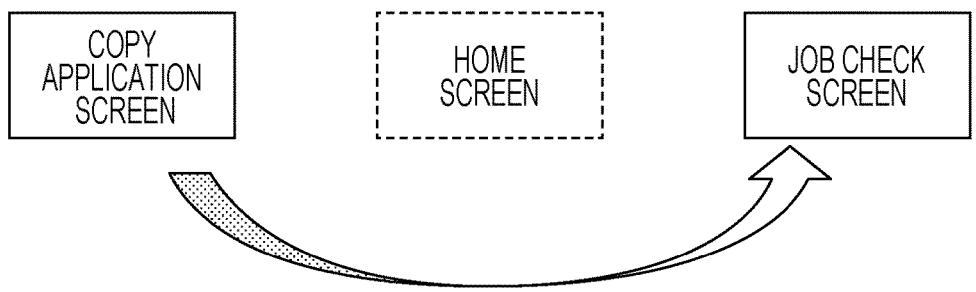

FIGS. 7A and 7B schematically illustrate a process according to the present exemplary embodiment.

FIG. 7A illustrates a process for a case where user notification information is simply displayed on the home screen. When the user checks user notification information for a different application in the case where the copy application screen is displayed, for example, a transition is made from the copy application screen to the home screen, the presence or absence of any user notification information is checked on the home screen, and then an application screen with user notification information is displayed.

In contrast, FIG. 7B illustrates the process according to the present exemplary embodiment. It is not necessary to transition to the home screen, since it is possible to check the presence of any user notification information for a different application by visually recognizing the shortcut menu and, moreover, it is possible to directly transition to an application screen with user notification information by operating the shortcut menu.

Figure 8:
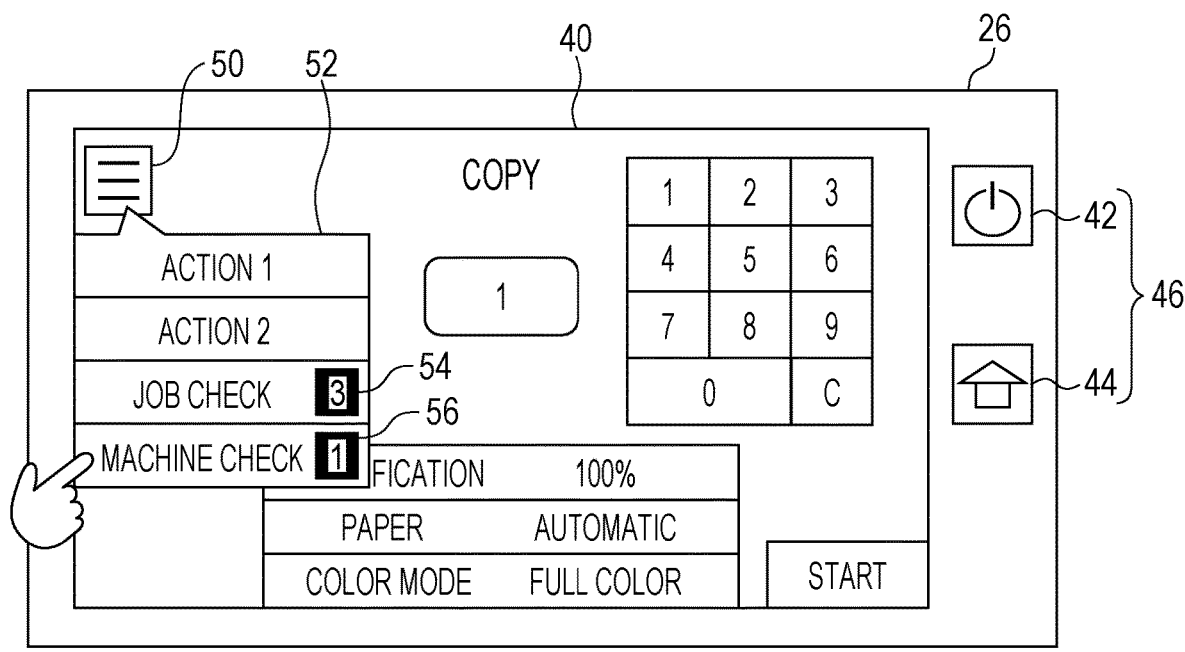
FIG. 8 illustrates a screen (fifth screen) according to the exemplary embodiment.

FIG. 8 illustrates a display example of the shortcut menu 52 which includes user notification information. When the user operates the shortcut menu button 50 on the copy application screen, the "job check application" and the "machine check application" are additionally displayed as a list of applications with user notification information in addition to the "action 1" and the "action 2" which are registered in advance. In addition, icons 54 and 56, which are similar to the icons 54 and 56 on the home screen, are displayed as superimposed on the job check application and the machine check application, respectively.

While the icons 54 and 56 on the home screen and the icons 54 and 56 in the shortcut menu are the same as each other in the example in FIG. 8, the icons may be shaped differently from each other.

Figure 9:
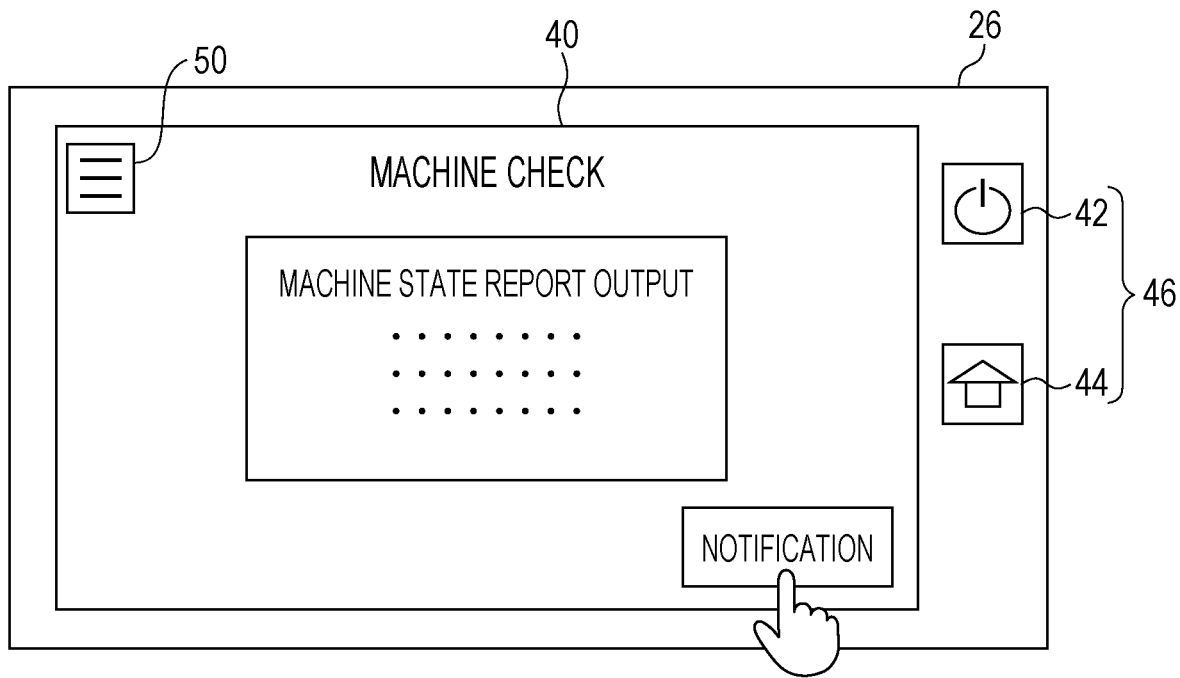
FIG. 9 illustrates a screen (sixth screen) according to the exemplary embodiment.

FIG. 9 illustrates a screen example for a case where the user performs an operation to select the machine check application in the shortcut menu 52 on the screen in FIG. 8. The shortcut menu display control section of the display control section 32 detects the operation by the user, and displays a machine check application screen by executing a process to start the machine check application. On the machine check application screen, a report on the machine state is output, and the presence of user notification information is displayed ("notification" in the drawing). When the user performs an operation to select the "notification" button, the detail of the user notification information is displayed on the screen.

Figure 10:
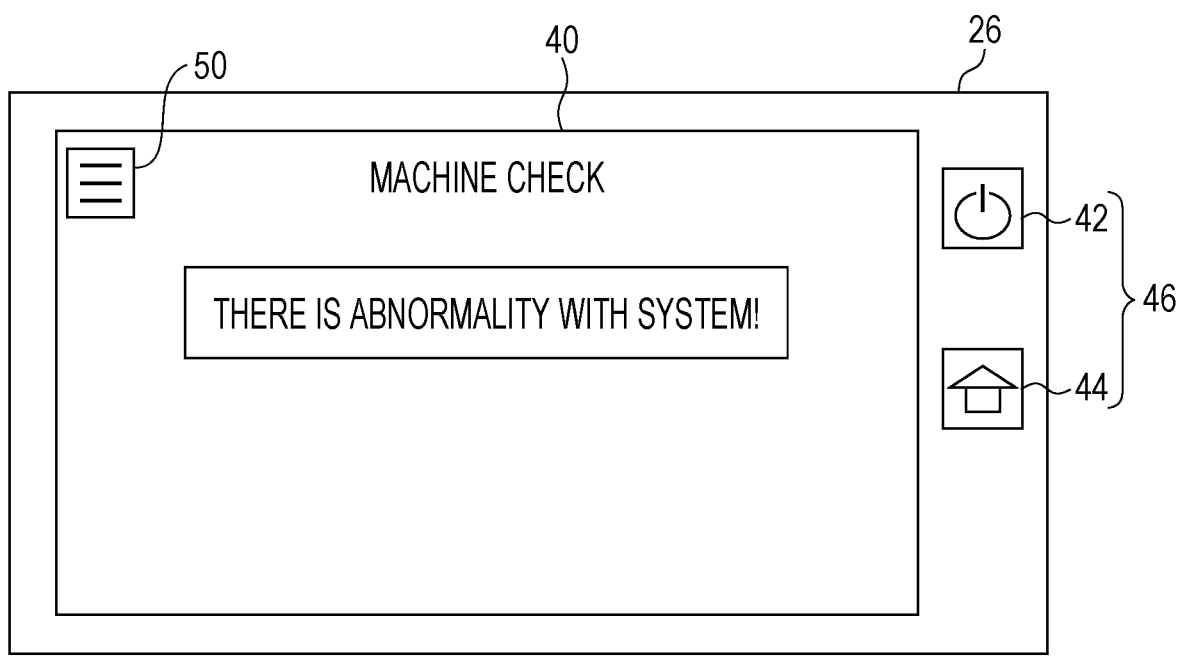
FIG. 10 illustrates a screen (seventh screen) according to the exemplary embodiment.

FIG. 10 illustrates a screen example with the user notification information for the machine check application. A message saying "There is an abnormality with the system" or the like is displayed. The user may take necessary measures, such as reporting to the administrator of the image forming device, by visually recognizing the message.

In the case where the user performs an operation to select the machine check application in the shortcut menu, a transition may be made directly to the screen in FIG. 10, which indicates the content of the user notification information, rather than to the screen in FIG. 9.

Figure 11:
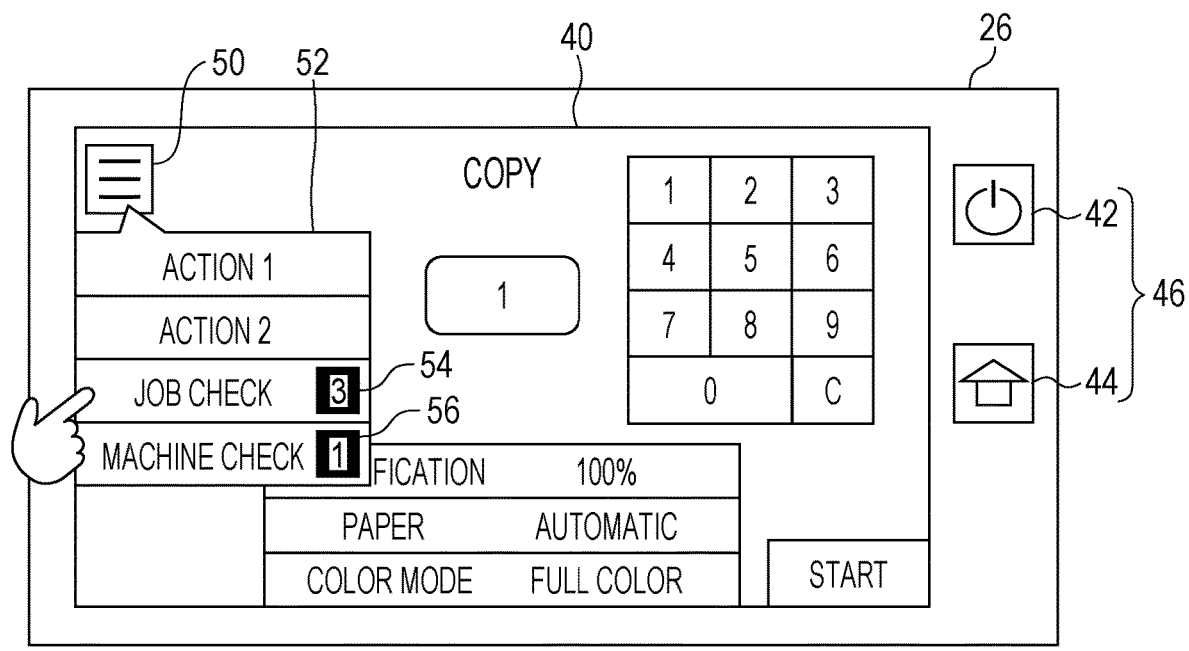
FIG. 11 illustrates a screen (eighth screen) according to the exemplary embodiment.

FIG. 11 illustrates a case where the user performs an operation to select the "job check application" in the shortcut menu 52 on the screen in FIG. 8.

Figure 12:
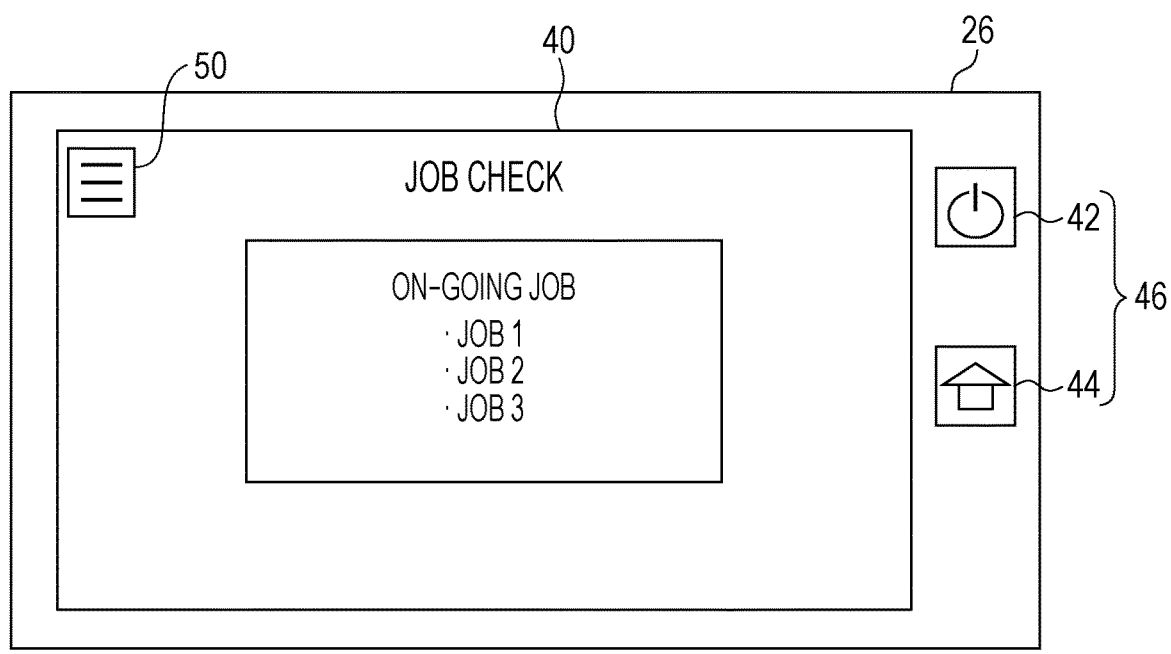
FIG. 12 illustrates a screen (ninth screen) according to the exemplary embodiment.

FIG. 12 illustrates a screen example for a case where the user performs an operation to select the "job check application" in the shortcut menu 52. The shortcut menu display control section of the display control section 32 detects the operation by the user, and displays a job check application screen by executing a process to start the job check application. On the job check application screen, jobs being executed (job 1, job 2, and job 3 in the drawing) are displayed in a list.

The shortcut menu button 50 is also displayed at the upper left portion of the screen illustrated in FIG. 12, as with the other screens. The user may check other user notification information, without returning to the home screen, by displaying the shortcut menu 52 by selecting the shortcut menu button 50.

Figure 13:
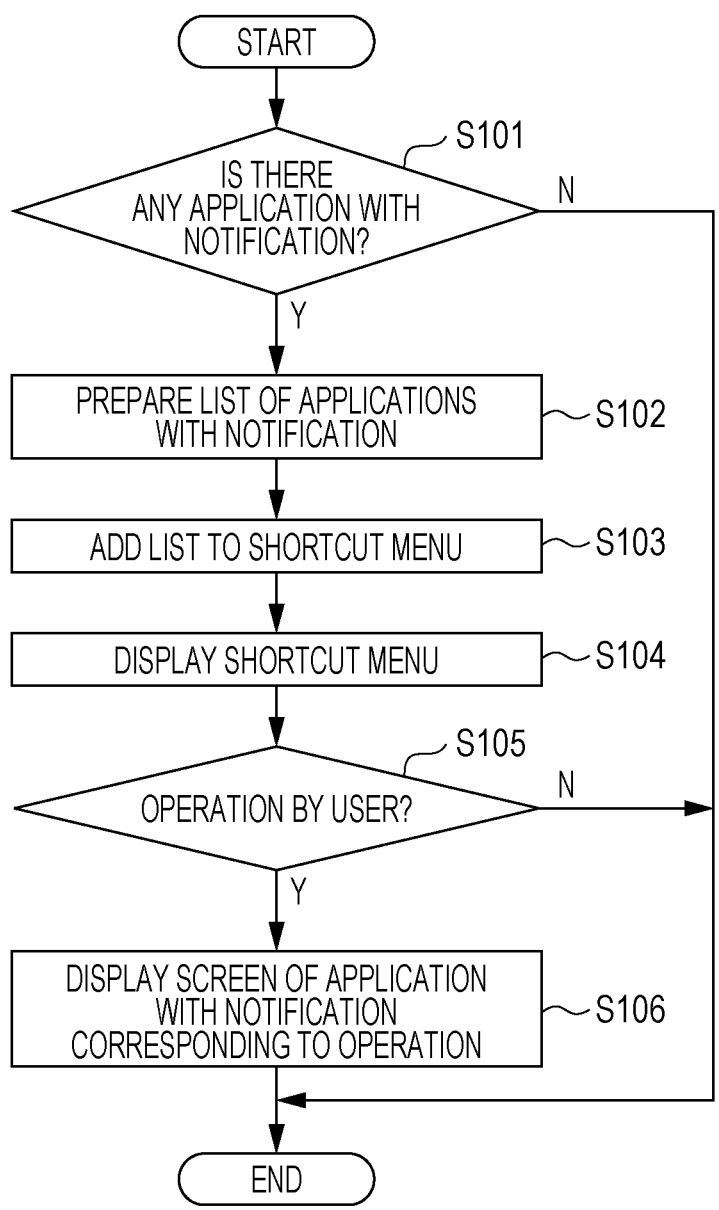
FIG. 13 is a process flowchart according to the exemplary embodiment.

FIG. 13 is a process flowchart according to the exemplary embodiment. The process is executed by the display control section 32 of the control section 22.

First, the display control section 32 determines whether or not there is any application that has user notification information by making an inquiry of the notification information management section of the application management section 34 (S101). When user notification information is generated for each application, the notification information management section registers the user notification information, which is provided from the application, for each application. Then, the notification information management section replies by specifying the application with the user notification information in response to the inquiry from the display control section 32. For example, if there is any user notification information for the job check application and the machine check application, the notification information management section replies to the display control section 32 with the presence of the user notification information and the number of pieces of the user notification information.

In the case where there are applications with user notification information (YES in S101), the display control section 32 prepares a list of applications with user notification information (S102), and adds the prepared list to the shortcut menu (S103). For example, if the applications with user notification information include the job check application and the machine check application, the display control section 32 prepares a list including the job check application and the machine check application, and adds the list to the shortcut menu. Then, the display control section 32 displays a shortcut menu button as incorporated at a predetermined position, e.g. the upper left, of the screen, and displays a shortcut menu in response to an operation on the shortcut menu button by the user (S104).

When the user operates the shortcut menu (YES in S105), the display control section 32 executes a process that matches the operated shortcut menu. If the operated shortcut menu is an application displayed in the list, the display control section 32 performs a process to start the application to display an application screen (S106).

In the case where there is no application with user notification information (NO in S101), no list is added to the shortcut menu. In this case, only the actions etc. registered in advance are displayed in the shortcut menu. In the case where the user does not perform an operation (NO in S105), meanwhile, the process in S106 is not executed, and the shortcut menu is continuously displayed.

The process in FIG. 13 is executed repeatedly in predetermined control cycles. Thus, if user notification information is generated for each application, the applications with user notification information which are registered in the notification information management section are updated on a case-by-case basis, and the list to be added to the shortcut menu is also updated accordingly. For example, when new user notification information is generated for a facsimile reception box application since a facsimile is received where a list of applications with user notification information includes
- job check application and
- machine check application at a certain timing t1, the list of applications with user notification information is updated so as to include
- job check application,
- machine check application, and
- facsimile reception box application at the next control timing t2.

In the case where the user visually recognizes the user notification information, on the other hand, the application requests the notification information management section to delete the user notification information, and the notification information management section deletes the user notification information in response to the request. Thus, the application, the user notification information for which has been deleted, is also deleted from the shortcut menu. For example, it is assumed that a list of applications with user notification information includes
- job check application,
- machine check application, and
- facsimile reception box application at a certain control timing t1. In the case where the user selects the facsimile reception box application from the list which is displayed in the shortcut menu and checks the user notification information by performing a process to start the facsimile reception box application, the facsimile reception box application is deleted from the notification information management section by a request from the facsimile reception box application. Thus, the list of applications with user notification information is updated so as to include
- job check application and
- machine check application at the next control timing t2.

In the case where the number of pieces of user notification information generated for the facsimile reception box application is three, for example, and the user checks only one of the three, the number of pieces of user notification information registered in the notification information management section is updated from three to two. Thus, needless to say, the number of pieces of user notification information for the facsimile reception box application is updated from three to two at the next control timing. The same also applies to the other applications.

While an exemplary embodiment of the present disclosure has been described above, the present disclosure is not limited thereto, and may be modified in various ways. Modifications will be described below.

First Modification

In the exemplary embodiment, the shortcut menu button and the shortcut menu which are displayed on a desired screen are used to display a list of applications with user notification information. However, a button that is different from the shortcut menu button may be displayed on a desired screen, and a list of applications with user notification information may be displayed in the case where the user performs an operation to select the different button.

Figure 14:
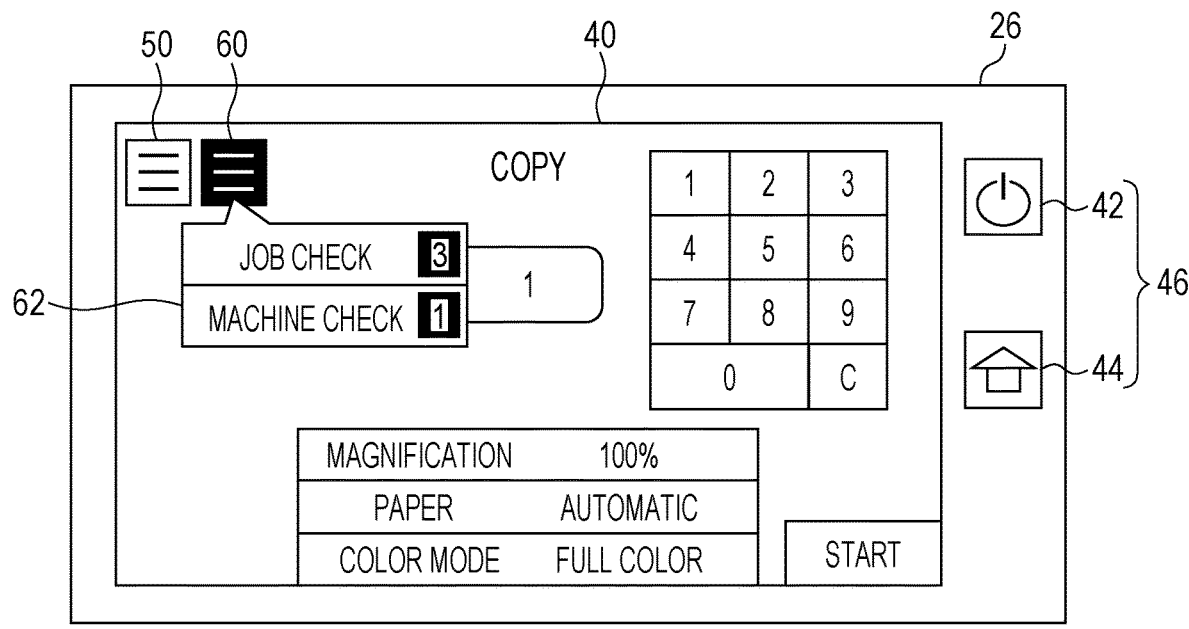
FIG. 14 illustrates a screen according to a first modification.

FIG. 14 illustrates a screen example for such a case. The shortcut menu button 50 is displayed at the upper left of the copy application screen, and a user notification button 60 is displayed side by side with the shortcut menu button 50. Specifically, the application display control section of the display control section 32 makes an inquiry of the notification information management section of the application management section 34 about the presence or absence of any application with user notification information when a process to start the copy application is performed to display the copy application screen, and if there is any application with user notification information, displays the user notification button 60 as incorporated in a part of the copy application screen.

When the user performs an operation to select the user notification button 60, the display control section 32 pops up a list 62 of applications prepared by being acquired from the notification information management section, that is, a list 62 of applications with user notification information. FIG. 14 illustrates a case where the applications with user notification information include the job check application and the machine check application. At this time, the number of pieces of user notification information may be displayed for each application.

In the case where no application is registered in the notification information management section, that is, there is no application with user notification information, the user notification button 60 is not displayed. The user is able to recognize that user notification information is not generated for an application on the basis of the fact that only the shortcut menu button 50 is displayed and the user notification button 60 is not displayed. In addition, the user is able to check the content of user notification information, without returning to the home screen, by performing an operation to select a desired application from the list 62.

While the user notification button 60 is displayed separately from the shortcut menu button 50, the user notification button 60 is also used as a shortcut for executing a specific screen or process, and thus considered to be a shortcut menu button. The shortcut menu 50 is considered to function as a first shortcut menu button, and the user notification button 60 is considered to function as a second shortcut menu button. Similarly, the list 62 is also considered to be a shortcut menu displayed in the case where the second shortcut menu button is operated.

Second Modification

In the exemplary embodiment, the shortcut menu button and the shortcut menu which are displayed on a desired screen are used to display a list of applications with user notification information. However, a list of applications with user notification information may be displayed in the case where the user performs a specific operation on a desired screen, e.g. performs a long-press operation at a blank space position on the screen.

Figure 15:
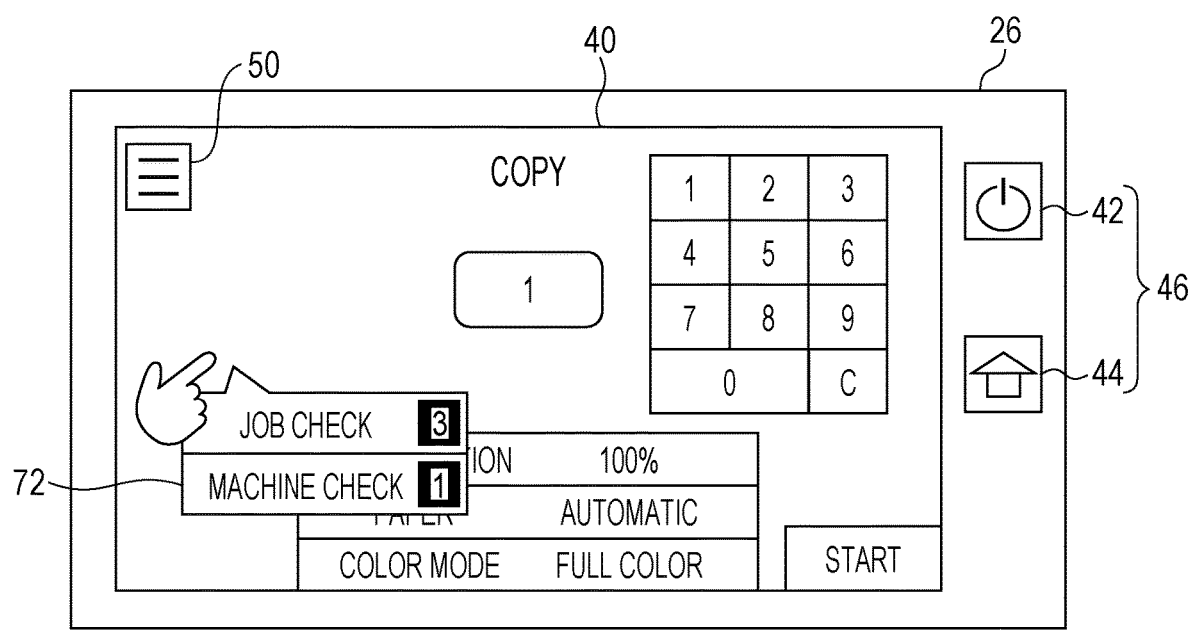
FIG. 15 illustrates a screen according to a second modification.

FIG. 15 illustrates a screen example for such a case. The shortcut menu button 50 is displayed at the upper left of the copy application screen.

When the user performs a long-press operation at a space portion (portion at which no item is displayed) on the screen, the display control section 32 detects the long-press operation by the user, and pops up a list 72 of applications prepared by being acquired from the notification information management section, that is, a list 72 of applications with user notification information. FIG. 15 illustrates a case where the applications with user notification information include the job check application and the machine check application. At this time, the number of pieces of user notification information may be displayed for each application.

In the case where no application is registered in the notification information management section, that is, there is no application with user notification information, the list 72 is not displayed even if the user performs a long-press operation. Instead, a message saying "There is no user notification information." may pop up.

Figure 16:
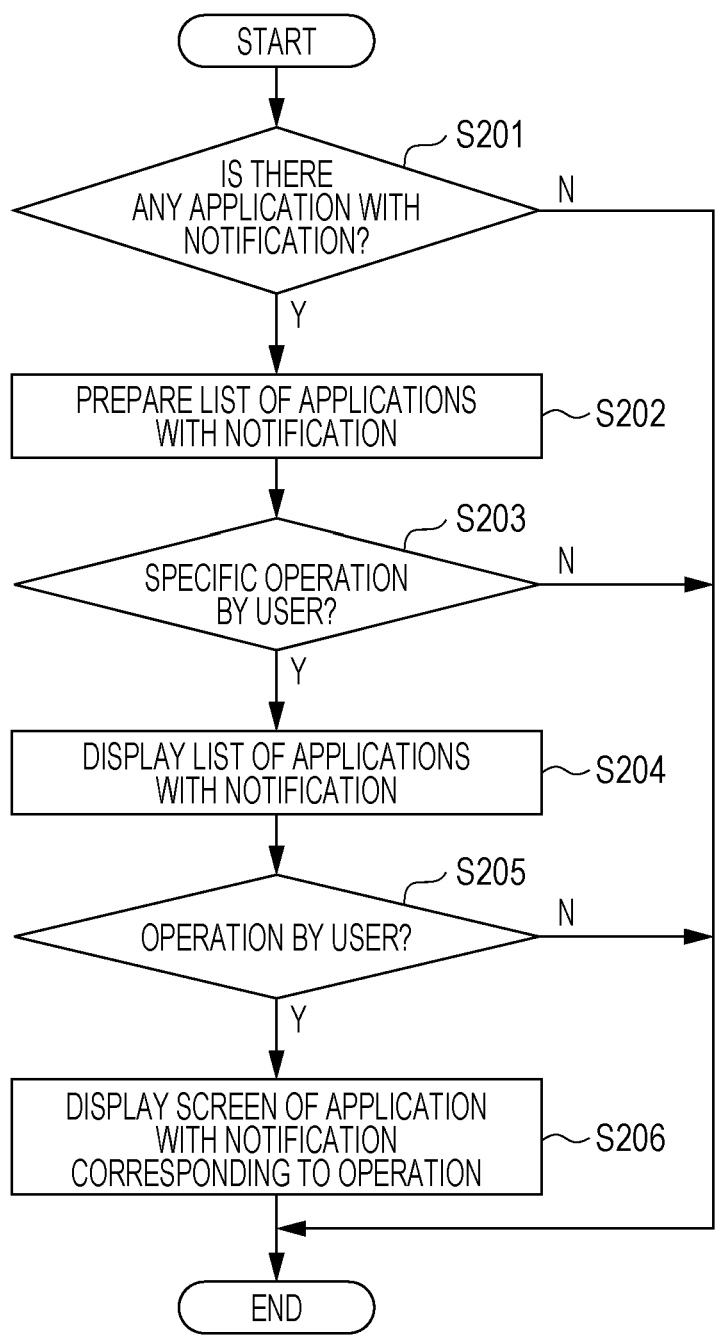
FIG. 16 is a process flowchart according to the second modification.

FIG. 16 is a process flowchart according to the modification. The process is executed by the display control section 32 of the control section 22.

First, the display control section 32 determines whether or not there is any application that has user notification information by making an inquiry of the notification information management section of the application management section 34 (S201). When user notification information is generated for each application, the notification information management section registers the user notification information, which is provided from the application, for each application. Then, the notification information management section replies by specifying the application with the user notification information in response to the inquiry from the display control section 32. For example, if there is any user notification information for the job check application and the machine check application, the notification information management section replies to the display control section 32 with the presence of the user notification information and the number of pieces of the user notification information.

In the case where there are applications with user notification information (YES in S201), the display control section 32 prepares a list of applications with user notification information (S202). For example, if the applications with user notification information include the job check application and the machine check application, the display control section 32 prepares a list including the job check application and the machine check application.

Next, the display control section 32 determines whether or not a specific operation is performed by the user (S203). The specific operation is a long-press operation performed at a blank space portion at which no object is displayed, for example. When a specific operation by the user is detected, the display control section 32 displays the prepared list (S204).

When the user performs an operation to select an application from the list (YES in S205), the display control section 32 performs a process to start the selected application to display an application screen (S206).

The process in FIG. 16 is also executed repeatedly in predetermined control cycles as with the process in FIG. 3. Thus, if user notification information is generated for each application, the applications with user notification information which are registered in the notification information management section are updated on a case-by-case basis, and the list is also updated accordingly. For example, when new user notification information is generated for a facsimile reception box application since a facsimile is received where a list of applications with user notification information includes job check application and
machine check application at a certain timing t1, the list of applications with user notification information is updated so as to include job check application,
machine check application, and
facsimile reception box application at the next control timing t2.

In the case where the user visually recognizes the user notification information, on the other hand, the application requests the notification information management section to delete the user notification information, and the notification information management section deletes the user notification information in response to the request. Thus, the application, the user notification information for which has been deleted, is also deleted from the shortcut menu. For example, it is assumed that a list of applications with user notification information includes job check application,
machine check application, and
facsimile reception box application at a certain control timing t1. In the case where the user selects the facsimile reception box application from the list which is displayed in the shortcut menu and checks the user notification information by performing a process to start the facsimile reception box application, the facsimile reception box application is deleted from the notification information management section by a request from the facsimile reception box application. Thus, the list of applications with user notification information is updated so as to include job check application and
machine check application at the next control timing t2.

In the process in S203, a long-press operation is used as an example of the specific operation. However, a different desired operation on the touch screen 40 may also be used. Examples include a tap operation with two fingers, a double tap operation, and a flick operation.

In the case where a specific operation by the user is detected, alternatively, the display control section 32 may make an inquiry of the user by displaying a pop-up message saying "Would you like to see a list of applications with user notification information?" or the like and display a list of applications in the case where the user gives an affirmative answer, rather than immediately displaying a list of applications with user notification information in the shortcut menu.

Third Modification

In the exemplary embodiment, in the case where there are a plurality of applications with user notification information, the order of display of the applications may be set under a certain rule.

For example, the degree of importance (e.g. three stages of high, middle, and low) may be set in the user notification information, and a list including machine check application and
job check application in this order may be displayed in the case where the degree of importance of the user notification information for the job check application is low and the degree of importance of the user notification information for the machine check application is high. At this time, the degree of importance of the user notification information may be displayed together. For example, the list may include machine check application (notification importance degree: high) and
job check application (notification importance degree: low).

The degree of importance may be displayed in the colors of the icons 54 and 56 in FIG. 11. For example, the user notification information with a high degree of importance may be displayed in red, and the user notification information with a low degree of importance may be displayed in green.

Alternatively, the display control section 32 may display at least some of applications with user notification information, rather than displaying a list of all the applications with user notification information. For example, the display control section 32 may display a list of applications with user notification information with a degree of importance that is equal to or higher than a threshold.

Alternatively, an application with a larger number of pieces of user notification information may be displayed in a higher place in accordance with the number of pieces of the user notification information. For example, in the case where the numbers of pieces of user notification information for the job check application, the machine check application, and the facsimile reception box application are three, one, and four, respectively, a list including facsimile reception box application,
job check application, and
machine check application in this order may be displayed.

Alternatively, an application with older (or newer) user notification information may be displayed in a higher place in accordance with the chronological order of the user notification information. For example, in the case where user notification information is generated for the job check application and thereafter user notification information is generated for the facsimile reception box application, a list of applications arranged in the reverse chronological order, that is, including facsimile reception box application and
job check application in this order, may be displayed.

Further, the order of display may be set in accordance with the attribute of the applications, rather than the attribute (such as degree of importance, number, or chronological order) of the user notification information. For example, the number of times of use of each application may be registered in the application management section 34, and an application with a larger number of times of use, among applications with user notification information, may be displayed in a higher place.

The order of display of applications may be set in accordance with an appropriate combination of the degree of importance, the number of pieces, and the chronological order of the user notification information. For example, setting may be made such that an application with newer user notification information and with a higher degree of importance may be displayed in a higher place.

The order of display of applications with user notification information may be set in accordance with a default rule, or may be set in accordance with an appropriate rule set by the user or the administrator of the image forming device 12.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display apparatus comprising:
a touch screen; and
a processor that displays a shortcut menu having at least one registered menu item in a case where a user performs a specific screen operation on the touch screen,
wherein the processor additionally adds a first application program into a list of application programs having user notification information at a time of the operation in the shortcut menu in case where the first user notification information corresponding to the first application program is present,
wherein the processor deletes the first application program from the list of application programs in the shortcut menu in case where the first user notification information corresponding to the first application program is recognized visually.

2. The display apparatus according to claim 1, wherein the processor displays a shortcut menu button on the touch screen, and displays the list of application programs in the shortcut menu in a case where the shortcut menu button is operated.

3. The display apparatus according to claim 1, wherein the processor displays the list of application programs in the shortcut menu in a case where the user performs a long-press operation on the touch screen.

4. The display apparatus according to claim 1, wherein the processor displays a screen of a selected application program in a case where the user performs an operation to select the application program from the list of application programs.

5. The display apparatus according to claim 4, wherein the processor displays a screen of the user notification information for the selected application program in a case where the user performs an operation to select the application program from the list of application programs.

6. The display apparatus according to claim 1, wherein the touch screen includes a home screen in which the application programs are each displayed using a representational figure, and
the processor displays a mark indicating presence of the user notification information for an application program with the user notification information in association with the representational figure.

7. The display apparatus according to claim 6, wherein the processor displays a screen of a selected application program, without displaying the home screen, in a case where the user performs an operation to select the application program from the list of application programs.

8. The display apparatus according to claim 7, wherein the processor displays a screen of the user notification information for the selected application program, without displaying the home screen, in a case where the user performs an operation to select the application program from the list of application programs.

9. The display apparatus according to claim 1, wherein the processor displays the list of application programs in accordance with a degree of importance of the user notification information.

10. The display apparatus according to claim 1, wherein the processor displays the list of application programs in accordance with a number of pieces of the user notification information.

11. The display apparatus according to claim 1, wherein the processor displays the list of application programs in accordance with a chronological order of the user notification information.

12. The display apparatus according to claim 1,
wherein the processor displays the list of application programs in accordance with a frequency of use of the application programs.

13. A non-transitory computer readable medium storing a program causing a computer to execute a process, the process comprising:

displaying a shortcut menu having at least one registered menu item in a case where a user performs a specific screen operation on a touch screen;

additionally adding a first application program into a list of application programs having user notification information at a time of the operation in the shortcut menu in case where the first user notification information corresponding to the first application program is present; and deleting the first application program from the list of application programs in the shortcut menu in case where the first user notification information corresponding to the first application program is recognized visually.

14. A display apparatus comprising:

a display means; and a display control means for displaying in a shortcut menu having at least one registered menu item in a case where a user performs a specific screen operation on the touch screen, and additionally adding a first application program into a list of application programs having user notification information at a time of the operation in the shortcut menu in case where the first user notification information corresponding to the first application program is present, and deleting the first application program from the list of application programs in the shortcut menu in case where the first user notification information corresponding to the first application program is recognized visually.

* * * * *